US009066465B2

(12) United States Patent
Hendrickson et al.

(10) Patent No.: US 9,066,465 B2
(45) Date of Patent: Jun. 30, 2015

(54) SOIL COMPACTION REDUCTION SYSTEM AND METHOD

(71) Applicant: Deere and Company, Moline, IL (US)

(72) Inventors: Larry L. Hendrickson, Savoy, IL (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 199 days.

(21) Appl. No.: 13/771,795

(22) Filed: Feb. 20, 2013

(65) Prior Publication Data

US 2014/0236431 A1    Aug. 21, 2014

(51) Int. Cl.
| A01B 79/00 | (2006.01) |
| A01B 76/00 | (2006.01) |
| A01B 63/14 | (2006.01) |
| A01B 69/00 | (2006.01) |

(52) U.S. Cl.
CPC .............. *A01B 79/005* (2013.01); *A01B 76/00* (2013.01); *A01B 63/145* (2013.01); *A01B 69/002* (2013.01)

(58) Field of Classification Search
CPC .... A01B 79/005; A01B 76/00; A01B 69/002; A01B 63/145
USPC .......................................................... 701/50
See application file for complete search history.

(56) References Cited

U.S. PATENT DOCUMENTS

| 4,527,241 | A | 7/1985 | Sheehan et al. |
| 5,216,483 | A | 6/1993 | Berthold et al. |
| 5,220,172 | A | 6/1993 | Berthold et al. |
| 5,282,389 | A | 2/1994 | Faivre et al. |
| 5,486,915 | A | 1/1996 | Jeffers et al. |
| 5,789,741 | A | 8/1998 | Kinter et al. |
| 5,793,035 | A | 8/1998 | Beck et al. |
| 5,826,666 | A * | 10/1998 | Tozawa et al. ..................... 172/7 |
| 5,995,894 | A | 11/1999 | Wendte |
| 6,119,442 | A | 9/2000 | Hale |
| 6,128,574 | A * | 10/2000 | Diekhans ....................... 701/410 |
| 6,178,253 | B1 | 1/2001 | Hendrickson et al. |
| 6,212,464 | B1 * | 4/2001 | Skotnikov ....................... 701/82 |
| 6,460,260 | B1 | 10/2002 | Alster |
| 6,475,081 | B2 | 11/2002 | Coers et al. |
| 6,551,451 | B2 | 4/2003 | Trung et al. |
| 6,584,390 | B2 | 6/2003 | Beck |
| 6,592,453 | B2 | 7/2003 | Coers et al. |
| 6,668,223 | B2 | 12/2003 | Blackmore et al. |
| 6,738,148 | B2 | 5/2004 | Dunne et al. |

(Continued)

FOREIGN PATENT DOCUMENTS

WO    2011063814 A    6/2011

OTHER PUBLICATIONS

B.K. Gibson, C.D. Parker & F.R. Musser, Corn Stalk Penetration Resistance as a Predictor of Southwestern Corn Borer (*Lepidoptera*: Crambidae) Survival, MidSouth Entomologist, 2009, vol. 3, 7-17, Missippi, www.midsouthentomologist.org.msstate.edu.

(Continued)

*Primary Examiner* — Russell Frejd
(74) *Attorney, Agent, or Firm* — Rathe Lindenbaum LLP

(57) ABSTRACT

A soil compaction reduction system and method determine a path through the field for a mobile machine or control a soil compaction characteristic of the mobile machine based upon a varying soil compaction characteristic of the mobile machine as the mobile machine traverses the field and based upon a soil compaction constraint.

21 Claims, 3 Drawing Sheets

(56) References Cited

U.S. PATENT DOCUMENTS

| | | | |
|---|---|---|---|
| 6,806,955 | B2 | 10/2004 | Jang |
| 6,839,127 | B1 | 1/2005 | Anderson |
| 6,874,304 | B2 | 4/2005 | Clauss |
| 6,951,514 | B1 | 10/2005 | Coers et al. |
| 6,990,459 | B2 | 1/2006 | Schneider |
| 6,999,877 | B1 | 2/2006 | Dyer et al. |
| 7,047,133 | B1 | 5/2006 | Dyer et al. |
| 7,047,135 | B2 | 5/2006 | Dyer et al. |
| 7,048,627 | B2 | 5/2006 | Fechner et al. |
| 7,064,810 | B2 | 6/2006 | Anderson et al. |
| 7,169,040 | B2 | 1/2007 | Kormann et al. |
| 7,184,892 | B1 | 2/2007 | Dyer et al. |
| 7,188,450 | B2 | 3/2007 | Raun et al. |
| 7,206,063 | B2 | 4/2007 | Anderson et al. |
| 7,216,033 | B2 | 5/2007 | Flann et al. |
| 7,228,214 | B2 | 6/2007 | Flann et al. |
| 7,302,837 | B2 * | 12/2007 | Wendte .................... 73/146.5 |
| 7,401,528 | B2 | 7/2008 | Deppermann et al. |
| 7,412,880 | B2 | 8/2008 | Barreiro et al. |
| 7,430,845 | B2 | 10/2008 | Kormann et al. |
| 7,520,117 | B2 | 4/2009 | Rieck et al. |
| 7,584,663 | B2 | 9/2009 | Missotten et al. |
| 7,604,712 | B2 | 10/2009 | Trung et al. |
| 7,694,500 | B2 | 4/2010 | Arnold et al. |
| 7,702,462 | B2 | 4/2010 | Fuessley et al. |
| 7,725,233 | B2 | 5/2010 | Hendrickson et al. |
| 7,805,917 | B2 | 10/2010 | Kempf et al. |
| 7,812,947 | B2 | 10/2010 | Shakespeare et al. |
| 7,861,606 | B2 | 1/2011 | Kormann |
| 7,916,898 | B2 | 3/2011 | Anderson |
| 7,921,626 | B2 | 4/2011 | Maertens et al. |
| 7,987,735 | B2 | 8/2011 | Mann, III et al. |
| 8,049,892 | B2 | 11/2011 | Shakespeare et al. |
| 8,061,114 | B2 | 11/2011 | Mossman et al. |
| 8,078,367 | B2 | 12/2011 | Sauder et al. |
| 2002/0117274 | A1 | 8/2002 | Jang |
| 2006/0196158 | A1 | 9/2006 | Faivre et al. |
| 2006/0196622 | A1 | 9/2006 | Trung et al. |
| 2006/0200334 | A1 | 9/2006 | Faivre et al. |
| 2006/0206623 | A1 * | 9/2006 | Gipps et al. .................... 709/238 |
| 2007/0068238 | A1 * | 3/2007 | Wendte .................... 73/146 |
| 2007/0239472 | A1 | 10/2007 | Anderson |
| 2007/0288167 | A1 | 12/2007 | Anderson et al. |
| 2007/0294994 | A1 | 12/2007 | Deppermann et al. |
| 2010/0008728 | A1 * | 1/2010 | Robson .................... 405/129.15 |
| 2010/0089176 | A1 | 4/2010 | Mann, III et al. |
| 2010/0089178 | A1 | 4/2010 | Tragesser et al. |
| 2010/0268679 | A1 | 10/2010 | Anderson |
| 2011/0011048 | A1 | 1/2011 | Hoffman |
| 2011/0153136 | A1 | 6/2011 | Anderson |
| 2012/0029761 | A1 | 2/2012 | Anderson |
| 2012/0050023 | A1 | 3/2012 | Sauder et al. |
| 2012/0113225 | A1 | 5/2012 | Deppermann et al. |
| 2012/0323452 | A1 * | 12/2012 | Green et al. .................... 701/50 |
| 2013/0205733 | A1 | 8/2013 | Peters et al. |

OTHER PUBLICATIONS

Croplan, Stalk Quality, Corn Expertise, 2010, 3 pages, http://www.croplangenetics.com/FINDSEED/CORN/ECMD014194.aspx.

D.D. Bochtis, C.G. Sorensen, & O. Green, Soil Compaction Reduction System (Socresy Report) Presentation, University of Aarhus, Faculty of Agricultural Sciences, Department of Biosystems Engineering, May 18, 2011, 17 pages, Denmark.

D.D. Bochtis, C.G. Sorensen, & O. Green, Soil Compaction Reduction System (Socresy Report), University of Aarhus, Faculty of Agricultural Sciences, Department of Biosystems Engineering, May 18, 2011, 17 pages, Denmark.

Dirk Vandenhirtz, High throughput plant phenotyping for the development of better plants for the future, LemnaTec Presentation from Oct. 27, 2010, 102 pages.

Duli Zhao, K. Raja Reddy, V. Gopal Kakani, John J. Read & Sailaja Koti, Canopy reflectance in cotton for growth assessment and lint yield prediction, ScienceDirect, Dec. 19, 2006, (26) 335-344, European Journal of Agronomy.

James C. Frisby & Donald L. Pfost, Soil Compaction: The Silent Theif, University of Missouri Extension, Department of Agricultural Engineering, Oct. 1993, 4 pages, http://extension.missouri.edu/p/G1630.

Jonathan P. Kelly, By-plant prediction of corn (*Zea mays* L.) grain yield using height and stalk diameter, ProQuest, Dec. 2011, 2 pages, Oklahoma State University, http://proquest.umi.com/pqdlink?did=2401960911&Fmt=7&clientId=79356&RQT=309&VName=PQD.

Lei Zhang & Tony E. Grift, A monocular vision-based diameter sensor for *Miscanthus giganteus*, ScienceDirect, Jan. 21, 2012, 298-304, Illinois, www.elsevier.com/locate/issn/15375110.

MDL Laser Systems, LaserAce HypsoMeter Simple "All in One" Heighting, Diameter & Log Volume Instrument with Data Storage, 02 22/05/06, Western Data Systems, Inc., www.laserace.com, 4 pages.

Peter Tittmann, Sohail Shafii, Bruce Hartsough, Bernd Hamann, Tree Detection and Delineation from LiDAR point clouds using RANSAC, SilviLaser, Oct. 16-19, 2011, Department of Geography, UCD, 23 pages.

Salas, Ene, Gregoire, Naesset & Gobakken, Modelling tree diameter from airborne laser scanning derived variables: A comparison of spatial statistical models, Elsevier Ltd., 2010, 5 pages, http://pubget.com/paper/pgtmp_8001e8721eb6c97b19ea68023001f58e/Modelling_tree_diameter_from_airborne_laser_scanning_derived_variables_A_comparison_of_spatial_statistical_models.

Sorin C. Popescu, Randolph H. Wynne & Ross F. Nelson, Measuring Individual Tree Crown Diameter With Lidar and Assessing Its Influence on Estimating Forest Volume and Biomass, Canadian Journal of Remote Sensing, vol. 29, No. 5, 564-577, 2003.

Steve Watson, Drought-stressed corn needs timely harvest to avoid stalk lodging, CNHI, www.farmtalknewspaper.com, Sep. 7, 2011, 2 pages,, http://farmtalknewspaper.com/crops/x1642542647/Drought-stressed-corn-needs-timely-harvest-to-avoid-stalk-lodging.

Thomas Hellstrom, Peter Hohnloser, Ola Ringdahl, Tree Diameter Estimation Using Laser Scanner, Department of Computing Science Umea University, Dec. 20, 2012, 15 pages, Umea Sweden.

University of Kentucky, Producers Should Check Corn's Stalk Strength Before Harvest, Crop Management, University of Kentucky Press Release, 1 page, Sep. 21, 2009, http://www.plantmanagementnetwork.org/pub/cm/news/2009/StalkStrength/.

University of Wisconsin Madison, Precision Agriculture Precision Modeling, 2003, 2 pages, Madison, Wisconsin, http://www.soils.wisc.edu/~norman/RESAC/agric/modeling.html.

Unknown, Improved System and Method for Controlling Agricultural Vehicle Operation Using Historical Data, unknown, 7 pages.

PCT international search report dated May 23, 2014.

* cited by examiner

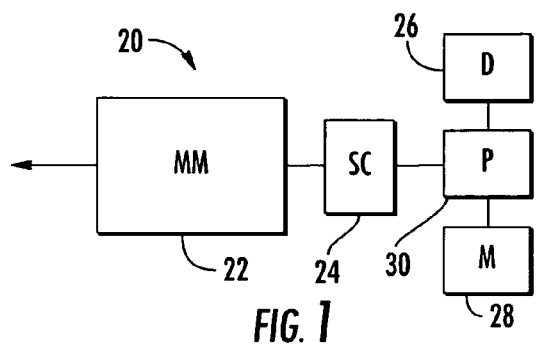
FIG. 1
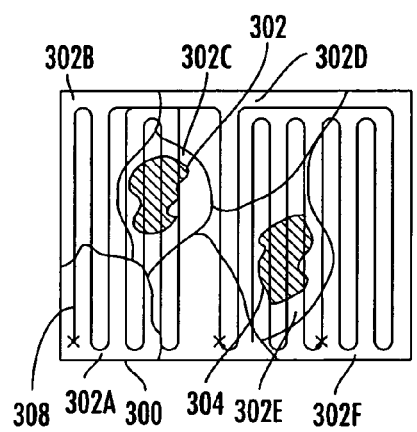
FIG. 4
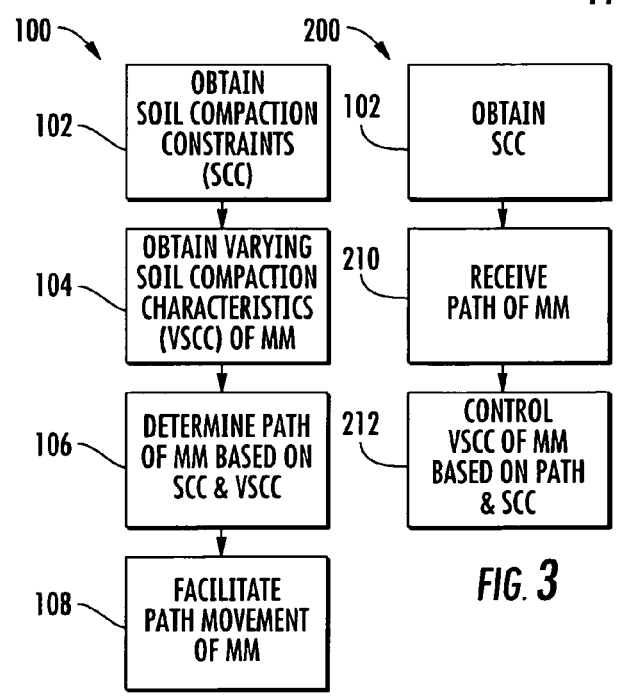
FIG. 2
FIG. 3

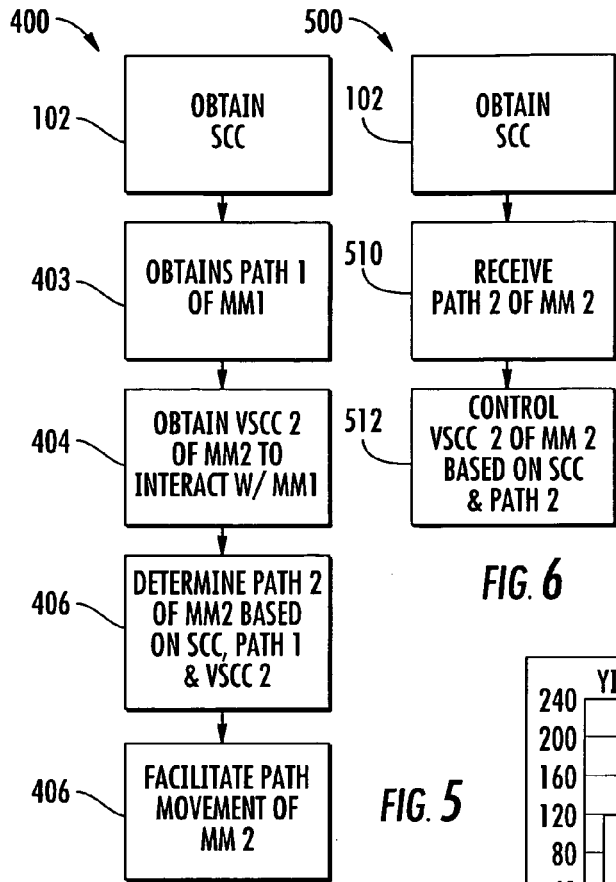
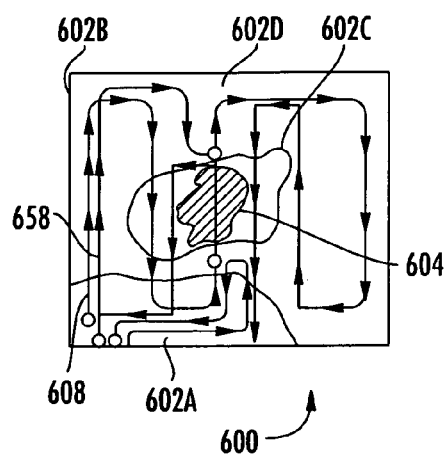
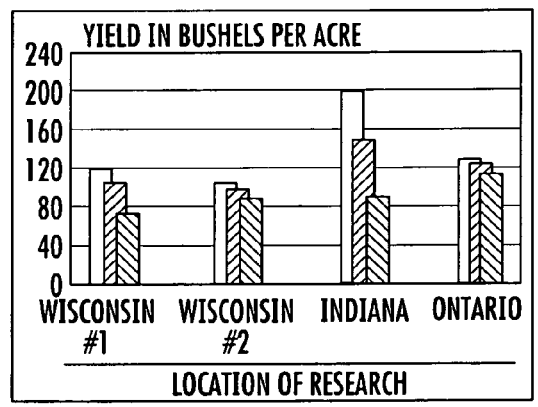
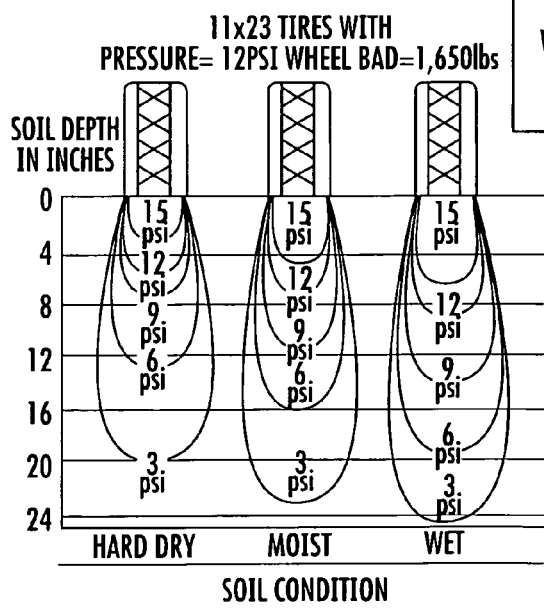

SOIL COMPACTION REDUCTION SYSTEM AND METHOD

CROSS-REFERENCE TO RELATED PATENT APPLICATIONS

The present application is related to co-pending U.S. patent application Ser. No. 13/771682 filed on the same day as a present and entitled CROP SENSING, the full disclosure of which is hereby incorporated by reference. The present application is related to co-pending U.S. patent application Ser. No. 13/771,727 filed on the same day as a present application and entitled PER PLANT CROP SENSING RESOLUTION, the full disclosure of which is hereby incorporated by reference. The present application is related to co-pending U.S. patent application Ser. No. 13/771,760 filed on the same day as a present and entitled CROP SENSING DISPLAY, the full disclosure of which is hereby incorporated by reference.

BACKGROUND

During planting, the application of herbicides, insecticides and fertilizer, cultivating, and harvesting, the soil may become compacted. Compacted soil may reduce harvest yields.

BRIEF DESCRIPTION OF THE DRAWINGS

FIG. 1 is a schematic illustration of an example soil compaction reduction system.

FIG. 2 is a flow diagram of an example method that may be carried out by the soil compaction reduction system of FIG. 1.

FIG. 3 is a flow diagram of another example method that may be carried out by the soil compaction reduction system of FIG. 1.

FIG. 4 is a diagram illustrating an example implementation of the methods of FIGS. 2 and 3 carried out by the soil compaction reduction system of FIG. 1.

FIG. 5 is a flow diagram of an example method that may be carried out by the soil compaction reduction system of FIG. 1 for a service mobile machine.

FIG. 6 is a flow diagram of another example method that may be carried out by the soil compaction reduction system of FIG. 1 for a service mobile machine.

FIG. 7 is a diagram illustrating an example implementation of the methods of FIGS. 5 and 6 carried out by the soil compaction reduction system of FIG. 1.

FIG. 8 is a graph illustrating an example expression of a soil compaction constraint for a region of a field.

FIG. 9 is a graph illustrating an example expression of a soil compaction constraint for a region of a field.

DETAILED DESCRIPTION OF THE EXAMPLE IMPLEMENTATIONS

Figure 10:
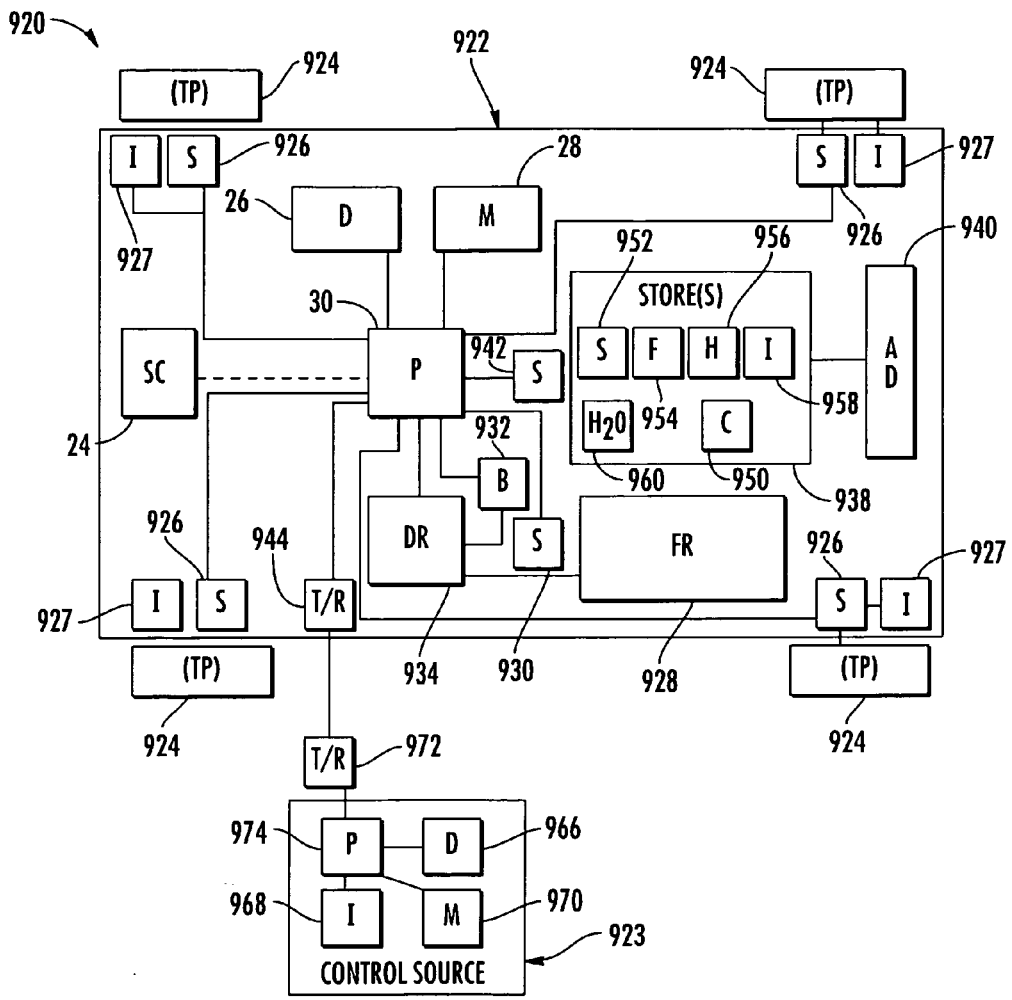
FIG. 10 is a schematic illustration of another example of a soil compaction reduction system.

FIG. 1 is a schematic illustration of an example soil compaction reduction system 20. Soil compaction reduction system 20 assists in reducing soil compaction during such activities as planting, the application of herbicides, insecticides and fertilizer, cultivating, harvesting, and/or the like. Soil compaction reduction system 20 comprises mobile machine 22, steering control 24, display 26, memory 28 and processor 30.

Mobile machine 22 comprises a device configured to traverse a field or plot of land to either carry out one of the aforementioned activities or to interact with another mobile machine 22 carrying out one or more of the aforementioned activities. In an example implementation, the term "mobile machine" means the vehicle itself which traverses the field or plot of land along with any and all attachments, implements or carriers that are pushed, carried or pulled by the vehicle itself. For example, a "mobile machine" may comprise a combine harvester, the tractor, a tractor and a planter, a tractor and a wagon, a tractor and a plow, a grain hauling truck, a tractor and a sprayer, a tractor and a nitrogen tank, a tractor and a grain drill, a tractor and its pulled bailer and wagon, and the like. Mobile machine 22 may be manually steered by an operator carried by the mobile machine or may be steered or controlled remotely.

Steering control 24 comprises a mechanism by which mobile machine 22 is steered, controlled or otherwise directed along a path across the field or plot of land. In one implementation, steering control 24 may comprise a mechanism to facilitate manual control and steering of mobile machine 22 along the path. In one implementation, steering control 24 may comprise a manual steering system carried by mobile machine 22 and having a steering wheel. In another implementation, steering control 24 may comprise a mechanism that facilitates control and steering of mobile machine 22 either locally under the control of one or more processing units or computers, remotely under the control of one or more remote processing units or computers, or remotely under the control of a remote operator. In those circumstances where steering control 24 facilitates remote steering of mobile machine 22, steering control 24 may comprise a communication device or transponder for transmitting and receiving control signals from a remote source.

Display 26 comprises a device by which information may be visibly presented to an operator of mobile machine 22 or a monitor/manager of mobile machine 22. Display 26 may comprise a monitor or screen which is stationary in nature or which is mobile in nature. In one implementation, display 26 is carried by mobile machine 22 along with the operator. In another implementation, display 26 may comprise a stationary or mobile monitor remote from mobile machine 22. In yet other implementations, display 26 may be mobile in nature, being provided as part of a computer tablet, smart phone, personal data assistant (PDA), wearable display and the like.

Memory 28 comprises a non-transient computer-readable medium or persistent storage device for storing data for use by processor 30 or generated by processor 30. In one implementation, memory 28 may additionally store instructions in the form of code or software for processor 30. The instructions may be loaded in a random access memory (RAM) for execution by processor 30 from a read only memory (ROM), a mass storage device, or some other persistent storage. In other implementations, hard wired circuitry may be used in place of or in combination with software instructions to implement the functions described. For example, at least regions of memory 28 and processor 30 may be embodied as part of one or more application-specific integrated circuits (ASICs). In one implementation, memory 28 is carried by mobile machine 22. In other implementations, memory 28 may be provided remote from mobile machine 22.

Processor 30 comprises one or more processing units configured to carry out instructions either hardwired as part of an application-specific integrated circuit or provided as code or software stored in memory 28.

FIG. 2 is a flow diagram illustrating an example method 100 that may be carried out by system 20 to address issues pertaining to soil compaction. As indicated by step 102, processor 30 obtains soil compaction constraints SCC for a field or plot of land over which mobile machine 22 is to traverse.

Such soil compaction constraints comprise limits, objectives, thresholds or targets for levels of soil compaction to be imposed upon the underlying land as mobile machine 22 drives across such land. Such soil compaction constraints may be expressed in various ways such as a maximum wheel load, a maximum mobile machine weight, a maximum tire pressure, a maximum amount of compaction, an amount of compaction at a particular depth, a maximum yield reduction due to soil compaction and the like. The field or plot of land may be partitioned into different areas or regions, wherein each regions is assigned a soil compaction constraint based upon specific soil compaction characteristics of the particular region such as soil type, topography, landscape position, or other factors. In one implementation, such regions are uniformly sized and shaped. In another implementation, such regions may have varying sizes and shapes such that each region contains land having a substantially uniform or homogeneous soil compaction characteristic based upon soil type, topography and other factors.

The soil compaction constraints may be identified by processor 30 based upon information such as historical crop yield information, planned interaction techniques (planting techniques, cultivating techniques, harvesting techniques), soil moisture data, topography data, soil type information, historical soil compaction data, overhead imagery of the land, past and/or future weather information, seed or crop characteristics or data, and the like. Such soil compaction constraints may vary across individual portions or regions of a single field or plot of land. For example, one particular region of the field may have a particular soil type, a particular moisture characteristic or a particular topography that may be less susceptible to yield reductions due to soil compaction for a particular seed type being planted and/or a particular planting technique as compared to another region of the field or plot of land. In lieu of processor 30 calculating or determining such soil compaction constraints, such soil compaction constraints may also be retrieved or obtained by processor 30 from a database, such as a database in memory 28 or a database in another memory, whether local or remote, whether owned by the operator of mobile machine 22 or acquired from another party or source. Such soil compaction constraints serve as factors utilized by processor 30 in determining a desirable path for mobile machine 22 across the field.

As indicated by step 104, processor 30 obtains varying soil compaction characteristics VSCC of mobile machine 22. In an example implementation, varying soil compaction characteristics means those characteristics of a mobile machine, such as mobile machine 22, that impact soil compaction by mobile machine 22 as it travels across a field. The varying soil compaction characteristics may vary as the mobile machine travels along a path through the field. Such varying soil compaction characteristics, in an example implementation, mean those characteristics of mobile machine 22 that may vary such that mobile machine 22 may cause different degrees or extents of soil compaction at different times upon the exact same underlying region of land under the exact same environmental conditions (moisture etc.). Examples of varying soil compaction characteristics of a mobile machine include, but are not limited to, tire pressure, soil engagement depth, soil engagement technique, fuel weight, commodity volume, load or weight (the volume, mass or weight of the crop being harvested), seed volume, load or weight, insecticide volume, load or weight, herbicide volume, load or weight, water volume, load or weight and fertilizer volume, load or weight. By way of example, a combine harvester will exhibit different weights and create different degrees of soil compaction as it travels across a field during harvest as fuel is consumed (reducing the contributing weight of the fuel) and as the weight of the commodity increases within the hold of the combine until emptied. A planter will exhibit different weights and create different degrees of soil compaction as it travels across a field during planting as fuel is consumed (reducing the contributing weight of the fuel) and as seed and fertilizer are dispersed (reducing the contributing weight of the seed and fertilizer). A sprayer will exhibit different weights and create different degrees of soil compaction as fuel is consumed (reducing the contributing weight of the fuel) and as herbicide, insecticide or fertilizer (such as liquid nitrogen fertilizer) are applied (reducing the contributing weight of such field application materials). A plow or disc being pulled by a tractor may exhibit different degrees of soil compaction in response to different soil tillage depths of the plow or disc.

Such varying soil compaction characteristics may be "obtained" by processor 30 receiving signals from one or more sensors associated with mobile machine 22, wherein the signals indicate the varying soil compaction characteristics of mobile machine 22 or provide information from which processor 30 may itself determine or estimate the varying soil compaction characteristics of mobile machine 22. Such varying soil compaction characteristics may comprise estimates or historical values for such soil compaction characteristics, wherein processor 30 retrieves the estimated values or historical values for the varying soil compaction characteristics of mobile machine 22 from a database stored in memory 28 or stored in another memory, either owned by the operator of mobile machine 22 or supplied from a governmental, commercial or other source. Some varying soil compaction characteristics may be determined by processor 30 using both stored information as well as sensed information pertaining to how soil compaction characteristics of mobile machine 22 may vary as it travels across a field.

In an example implementation, the term "seed" means any region or portion of a plant, regardless of its age or state of germination, which may be sown or from which a full-grown mature plant may result. For example, the term "seed" comprises embryonic plants, tubers, seedlings, billets and the like.

As indicated by step 106, using the obtained soil compaction constraints for different regions of a field or plot of land and using the obtained varying soil compaction characteristics of mobile machine 22 as it traverses the regions of the field or plot of land, processor 30 determines a recommended path for mobile machine 22. In one implementation, the path may cover the entire field and all regions of the field, resulting in all regions of the field being acted upon (planted, harvested, cultivated, applied with herbicide, insecticide and/or fertilizer). In some implementations, the recommended path may simply avoid those regions of the field that are so susceptible to yield loss due to soil compaction that any yield enhancements that may be achieved by a particular action on such regions (cultivation, herbicide, insecticide or fertilizer application) is outweighed by yield reductions brought about by soil compaction. In some implementations, the recommended path may avoid particular regions of the field where it is determined that planting in such regions is not justified.

In one implementation, system 20 provides an operator with the opportunity to select or choose from a variety of different path determination techniques that the process 30 will use when determining the path. For example, in one implementation, processor 30 may generate control signals, following instructions contained in memory 28, directing display 26 to present prompts for different path determination techniques, allowing an operator to choose a particular path determination technique to be used by processor 30. In one implementation, processor 30, following instructions contained in memory 28, may compare and analyze multiple path determination techniques and either recommend a particular technique or automatically select a particular technique or an amalgamation of techniques based upon historical preferences by an operator, cost calculations, path simplicity considerations or other factors.

Examples of path determination techniques are as follows. According to a first technique, processor 30 determines a recommended path such that a soil compaction maximum restraint of each and every region of the field is satisfied. According to a second technique, processor 30 determines a recommended path so that no individual region violates its assigned soil compaction constraint by a predetermined amount. For example, three regions of a field may have soil compaction constraints expressed as wheel loads of 1600, 1700 and 1800 pounds, respectively. Although it may be impossible to identify a path in which the soil compaction constraints of all three regions are satisfied, processor 30 may determine a path such that none of the three regions violates its associated soil compaction constraint by more than 100 pounds of wheel load. According to a third technique, processor 30 may recommend a path so that the number of regions for which the associated soil compaction constraint is satisfied is maximized. According to a fourth technique, processor 30 determines a recommended path so that the collective size of regions that satisfy their associated soil compaction constraints is maximized. According to a fifth technique, processor 30 may determine a path so that the collective or cumulative degree by which the regions violate or vary from their associated soil compaction constraints is minimized. For example, processor 30 may determine a path that exceeds the soil compaction constraints for one region by a large degree (much larger than the predetermined amount of the second implementation), but which the degree of violation is more than offset by the extent or degree to which the other regions satisfy their soil compaction constraints. Said another way, in terms of soil compaction itself, the path may be chosen such that one region experiences a very large degree of soil compaction, but this large degree of soil compaction in the one region is compensated for by soil compaction reductions in other regions. In yet other implementations other path determination techniques may be employed or less than all of the above described techniques may be provided to the operator as an option.

In some implementations, processor 30 may base its determination of the path of mobile machine 22 upon other factors in addition to the particular soil compaction constraints of the particular regions. For example, processor 30 may additionally obtain information regarding the operational cost of mobile machine 22, the cost associated with the time being utilized to operate mobile machine 22, the expected yield gains (or losses) associated with such control adjustments, soil erosion characteristics of a region and estimated soil erosion characteristics/values for a particular path through the region, the topography of the region or of the field, commodity market prices, time deadlines due to upcoming weather events, the closeness or proximity of sequential passes, the number of refill stops or emptying stops, and/or the like. Upon obtaining such information, processor 30 may adjust the recommended route or path based upon selection criteria. For example, in one implementation, processor 30, following instructions contained in memory 28, may prompt the operator to select or prioritize criteria. An operator may be presented with the option of choosing a control mode wherein one or more of such additional factors (operational cost, time costs, time deadlines etc.) are or are not factored into the determination of the path for mobile machine 22. The operator may further input as to how such factors are weighted in such control. For example, processor 30 may compare the operational cost for one path to another path against the reduced soil compaction and corresponding estimated increase in yield of the two paths to determine the economics of which path to recommend or automatically carry out.

As indicated by step 108 of FIG. 2, processor 30 utilizes the determined path to facilitate movement of mobile machine 22 along the determined path. In one implementation, processor 30, following instructions contained in memory 28, causes display 26 to present the determined path and/or guidance for steering of mobile machine 22. For example, the determined path may be presented on display 26. If desired, the instantaneous position of mobile machine 22 and its positioning with respect to the determined path may be concurrently indicated on display 26. In one implementation, display 26 may include a speaker or an additional external speaker may be provided, wherein auditory directions or instructions may be provided such as instructing the operator when to manually turn mobile machine 22 to maintain mobile machine 22 on the determined path. In yet other implementations, processor 30 may directly communicate with steering control 24 and may entirely or at least partially direct steering control 24 to steer mobile machine 22. For example, processor 30 may exhibit entire control of steering control 24. In another implementation, processor 30 may sense the manual steering of steering control 24 and output alerts (visually, haptically, and/or audibly) when mobile machine 22 is diverting from the determined recommended path.

FIG. 3 is a flow diagram illustrating an alternative example method 200 that may be carried out by system 20. In one implementation, method 200 comprises a selectable mode of operation for system 20, wherein method 100 may also be chosen. For example, processor 30, following instructions contained in memory 28, may cause display 26 to present an operator with the option of employing method 100, employing method 200 or employing both methods 100 and 200.

As shown by FIG. 3, method 200 includes step 102 as described above with respect to method 100. As indicated by step 210, processor 30 receives, acquires or otherwise obtains the intended path of mobile machine 22 across the field or plot of land for which soil compaction constraints were obtained in step 102. In one implementation, the path received in step 210 may comprise a path that was determined independent of soil compaction characteristics of the field or plot of land, independent of soil compaction constraints, independent of varying soil compaction characteristics of mobile machine 22 and/or independent of varying environmental conditions. In another implementation, where methods 100 and 200 are used in conjunction with one another, the path received in step 210 may be the recommended path as determined in step 106. The path obtained in step 210 may be manually input by the operator or may be retrieved from a database in memory 28 or another memory or may be transmitted to mobile machine 22.

As indicated by step 212, processor 30, following instructions contained in memory 28, controls the variable soil compaction characteristics of mobile machine 22 based upon the path received in step 210 and the obtained soil compaction constraints of the different regions of the field or plot of land being worked. In an example implementation, control of the variable soil compaction characteristics of mobile machine 22 means the establishment and/or adjustment of parameters associated with the operation of mobile machine 22 which impact soil compaction. Examples of such control over the variable soil compaction characteristics of mobile machine 22 include, but are not limited to, controlling or adjusting the tire pressure of mobile machine 22, controlling or adjusting energy consumption by mobile machine 22, controlling or adjusting the rate at which herbicide, insecticide, water and fertilizer is dispersed, controlling or adjusting the location and/or times at which fuel, seed, herbicide, insecticide, water and/or fertilizer is replenished, controlling or adjusting the location and/or times at which commodity (the harvested crop) is removed or emptied from mobile machine 22, controlling or adjusting how mobile machine 22 interacts with the ground or when specific different interactions with the ground occur. For example, processor 30 may generate control signals adjusting energy consumption by generating control signals that vary or control at what times mobile machine 22 runs on electrical power versus at what times mobile machine 22 runs on fuel. Processor 30 may generate control signals controlling or adjusting the speed at which mobile machine 22 traverses a region or the rate at which fuel is consumed to impact soil compaction characteristics of mobile machine 22. In some implementations, processor 30 may generate control signals controlling or adjusting how the mobile machine 22 interacts with the soil such as the width of the tires, the number of tires lowered into engagement with the ground, the depth at which mobile machine 22 engages or interacts with the ground (plowing, disking etc.). Ground engaging elements on implements may be controlled on a per-machine, per-section, or per-row basis.

In one implementation, such control of the one or more varying soil compaction characteristics of mobile machine 22 may be automatically performed by processor 30 automatically generating control signals during the operation of mobile machine 22. In another implementation, processor 30 may prompt an operator to confirm any adjustment of such varying soil compaction characteristics of mobile machine 22 prior to operation of mobile machine 22 or during the operation of mobile machine 22 within a field. In one implementation, processor 30 may prompt the operator to select which varying soil compaction characteristics of mobile machine 22 may be automatically adjusted and which adjustments require operator confirmation or approval.

In some implementations, processor 30 may base its control of the variable soil compaction characteristics of mobile machine 22 on other factors in addition to the particular soil compaction constraints of the particular regions and the route of the path of mobile machine 22. For example, processor 30 may additionally obtain information regarding the operational cost of mobile machine 22, the cost associated with the time being utilized to operate mobile machine 22, the expected yield gains (or losses) associated with such control adjustments, commodity market prices, time deadlines due to upcoming weather events and the like. Upon obtaining such information, processor 30 may adjust the control of the variable soil compaction characteristics of the mobile machine 22 based upon selection criteria. For example, in one implementation, processor 30, following instructions contained in memory 28, may prompt the operator to select or prioritize criteria. An operator may be presented with the option of choosing a control mode wherein one or more of such additional factors (operational cost, time costs, time deadlines etc.) are or are not factored into the control of the variable soil compaction characteristics of mobile machine 22. The operator may further input how such factors are weighted in such control. For example, processor 30 may compare the operational cost for one VSCC control option against the reduced soil compaction and corresponding estimated increase in yield to determine the economics of whether or not to implement such control or to what extent such control should be carried out.

FIG. 4 illustrates an example implementation of system 20 and methods 100, 200 with respect to a field 300. As shown by FIG. 4, field 300 is partitioned into multiple regions 302A-302F (collectively referred to as regions 302). In the example illustrated, each of regions 302 has boundaries or is partitioned such that substantially homogenous soil compaction characteristics exist within each of regions 302. Each of regions 302 is further assigned one or more soil compaction constraints based upon the particular soil compaction characteristics of the region 302. In the example illustrated, regions 302C and 302E are illustrated as having wet spots 304. As a result, regions 302C and 302E may be more susceptible to soil compaction and may be assigned more stringent soil compaction constraints.

FIG. 4 further illustrates path 308 through field 300 as determined by processor 30 according to method 100. As discussed above, upon obtaining soil compaction constraints assigned to each of regions 302, processor 30 further obtains varying soil compaction characteristics of the particular mobile machine 22 to act upon field 300. Based upon the obtained soil compaction constraints and the varying soil compaction characteristics of mobile machine 104, processor 30 determines path 308. In the example illustrated, with particular respect to the individual regions 302C and 302E, path 308 may be drawn by processor 30 such that mobile machine 22 has a lower weight or otherwise has a lower soil compaction impact at those times that mobile machine 22 is in regions 302C and 302E so as to better satisfy the more stringent soil compaction constraints associated with regions 302C and 302E. As noted above, in some implementations, path 308 may be devised by processor 30 based upon additional factors such as time, cost and path complexity. For example, path 308 may be devised to reduce the number of turns required of mobile machine 22 or to minimize fuel consumption while still satisfying the soil compaction constraints or minimally deviating from such soil compaction constraints.

During movement of mobile machine 22 along path 308, processor 30 may determine or retrieve information regarding the varying soil compaction characteristics of mobile machine 22. Based upon path 308 and the previously obtained soil compaction constraints of the various regions 302, processor 30 may adjust one or more varying soil compaction characteristics of mobile machine 22 to better accommodate soil compaction constraints assigned to the different regions 302. In other implementations, mobile machine 22 may estimate the varying soil compaction characteristics of mobile machine 22 at various locations along path 308 and may adjust one or more operations of mobile machine 22 to modify or adjust the soil compaction characteristics of mobile machine 22 at particular locations to better accommodate soil compaction constraints of regions 302. Such adjustments to the varying soil compaction characteristics of mobile machine 22 which are predetermined prior to the operation of mobile machine 22 in field 300 may be predetermined and stored in memory 28 for subsequent use while mobile machine 22 is operating in field 300.

By way of example with regard to regions 302C and 302E, processor 30 may generate control signals adjusting energy consumption by mobile machine 22 such that the amount and weight of fuel within mobile machine 22 is at a low point when mobile machine 22 is in or is crossing regions 302C and 302E, thereby reducing the soil compaction due to mobile machine 22 at such times. Such adjustment may be made by adjusting the rate at which fuel is consumed by mobile machine 22 or by appropriately switching mobile machine 22 to an alternate source of energy (such as a battery). Processor 30 may generate control signals causing display 26 to notify an operator at what times along path 308 that mobile machine 22 should be replenished with fuel, seed, insecticide, herbicide or fertilizer to minimize the weight added to mobile machine 22 when mobile machine 22 nears traversing such regions 302C and 302E. In other implementations, processor 30 may generate control signals causing display 26 to notify an operator at what times along path 308 that mobile machine 22 should be emptied or discharged of commodity to reduce the weight of mobile machine 22 when mobile machine 22 is traversing regions 302C and 302E. In some implementations, processor 30 may generate control signals automatically (or upon confirmation or approval from the operator) adjust the operational depth (tillage depth) of mobile machine 22 when traversing regions 302C and 302E to reduce soil compaction. In some implementations, processor 30 may generate control signals automatically, or upon operator confirmation, adjust an operational width (adjusting a wheel spacing or raising/lowering a wing of a pulled implement) of mobile machine 22 when traversing regions 302C and/or 302E.

As shown by FIGS. 5 and 6, in addition to determining a path for a main mobile machine MM 1 and/or controlling one or more varying soil compaction characteristics of the main mobile machine MM 1, system 20 may additionally carry out similar functions with regard to a second or secondary mobile machine MM 2. The secondary mobile machine may be similar to mobile machine 22 described above in that it may also comprise steering control 24, memory 28, display 26 and processor 30 described above with respect to FIG. 1. In an example implementation, the mobile machine MM 2 interacts with the main mobile machine MM 1 to support the main mobile machine MM 1. For example, in situations where the main mobile machine MM 1 comprises a harvesting machine, the secondary mobile machine may be a machine to receive commodity from the main mobile machine MM 1 for transporting such commodity. In situations where mobile machine MM 1 comprises tractor and associated planter, the secondary mobile machine may comprise a truck, tank or other vehicle that supplies one or more of seed, fertilizer, water, insecticide, herbicide for replenishing the main mobile machine MM 1. Such interactions of the mobile machine MM 2 with the main mobile machine MM 1 may occur while the two mobile machines are traveling parallel or in synchronization to one another or while the two mobile machines are stopped at a point of intersection.

FIG. 5 is a flow diagram illustrating an example method 400 that may be carried out by system 20 with respect to a secondary mobile machine MM 2. As indicated by step 102, the processor 30 associated with the control of the secondary mobile machine MM 2 obtains the soil compaction constraints for each of the regions of a field as described above respect to method 100. The processor 30 that is associated with the control of the secondary mobile machine MM 2 may comprise the same processor 30 that is associated with the control of the main mobile machine MM 1 or may be a separate processor 30.

As indicated by step 403, the processor 30 associated with the control of MM 2 obtains the determined recommended path (Path 1) along which the main mobile machine 22 (MM 1) is to traverse across a field. In those implementations in which the processor 30 associated with the control of MM 2 is the same processor that is associated with the control of MM 1, such retrieval may be internal. In those implementations in which the processor 30 associated with the control of MM 2 is distinct from the processor associated with control of MM 1, the processor associated with control of MM 2 may obtain path 1 of MM 1 through direct manual input by an operator, by reading a portable memory device (flash drive, disk etc.) or through retrieval from the memory 28 or another remote memory in a wired or wireless fashion. Although the obtained Path 1 of MM 1 is described as being the path determined according to method 100, in other implementations, method 400 may alternatively utilize any other path along which MM 1 is to traverse a field, wherein the path is not based upon any soil compaction constraints of the field or its regions.

As indicated by step 404, the processor 30 associated with the control of MM 2 obtains the varying soil compaction characteristics VSCC 2 of MM 2 which occur to achieve interaction with MM 1. Examples of VSCC 2 include, but are not limited to, tire pressure, fuel weight, commodity volume, load or weight (the volume, mass or weight of the crop being transported), and the weight of the supplied materials such as seed volume, load or weight, insecticide volume, load or weight, herbicide volume, load or weight, water volume, load or weight and fertilizer volume, load or weight.

As indicated by step 406, the processor 30 associated with the control of MM 2 determines a recommended path (Path 2) for MM 2 based upon the obtained soil compaction constraints of the various regions, the path 1 of MM 1 and the varying soil compaction characteristics of MM 2. In one implementation, the one or more processors 30 associated with the control of MM 1 and MM 2 may iteratively adjust both Path 1 and Path 2 to identify the collection of paths that best satisfies the soil compaction constraints of the regions of the field. In other implementations, the path of MM 1 may be fixed and may not be adjusted based upon Path 2.

In one implementation, not only does processor 32 determine the path of MM 2 that satisfies compaction constraints of the regions of the field, but also the number of servicing paths, the size or type of the secondary or servicing mobile machine MM 2 or the extent to which the secondary mobile machine is filled with replenishing supplies may be modified. For example, the one or more processors determining the paths of main mobile machine MM 1 and the servicing mobile machine or machines MM 2 may receive inputs from an operator indicating different sizes of different available servicing mobile machines MM 2. Based upon such input, the one or more processors may determine multiple different recommended paths for multiple smaller servicing mobile machines MM 2. In some circumstances, the one or more processors may determine that the soil compaction constraints are better satisfied with multiple trips or paths by a single or multiple servicing mobile machines MM 2. This may be the case, for example, even though such a determination may result in additional trips across the field, the lighter weight of the smaller servicing mobile machines MM 2 may have a lower extent of soil compaction, albeit spread out across a larger area. In some circumstances, the one or more processors may determine that the soil compaction constraints are better satisfied with multiple trips or paths by the same servicing mobile machine filled to a first extent with replenishing supplies rather than a single trip or path by the servicing mobile machine MM 2 filled with replenishing supplies to a second greater extent because even though such a determination may result in additional trips across the field, the lighter weight of the servicing mobile machine due to being filled to a lesser extent may also have a lower extent or density of soil compaction, albeit spread out across a larger area.

As indicated by step 408 of FIG. 5, the processor associated with the control of MM 2 utilizes the determined path to facilitate movement of mobile machine MM 2 along the determined path. In one implementation, the processor 30 causes display 26 to present the determined path and/or guidance for steering of the mobile machine MM 2. For example, the determined path may be presented on display 26. If desired, the instantaneous position of the mobile machine 22 and its positioning with respect to the determined path may be concurrently indicated on display 26. In one implementation, display 26 may include a speaker or an additional external speaker may be provided, wherein auditory directions or instructions may be provided such as instructing the operator when to manually turn the servicing mobile machine MM 2 to maintain mobile machine MM 2 on the determined path. In yet other implementations, processor 30 may directly communicate with steering control 24 and may entirely or least partially direct steering control 24 to steer the mobile machine MM 2. For example, processor 30 may exhibit entire control of steering control 24. In another implementation, processor 30 may sense the manual steering of steering control 24 and output alerts (visually, haptically, and/or audibly) when the mobile machine MM 2 is diverting from the determined recommended path.

FIG. 6 is a flow diagram illustrating a method 500 for use by system 20. Similar to method 200, method 500 is a method that results in the varying soil compaction characteristics of the mobile machine MM 2 being controlled and adjusted based upon the soil compaction constraints of the field being traversed and the Path 2 of the mobile machine MM 2. As indicated by step 102 of method 500, the one or more processors obtain the soil compaction constraints of the reason of the field as described above with respect to method 100.

As indicated by step 510, the processor associated with control of MM 2 receives, acquires or otherwise obtains the intended path of MM 2 across the field or plot of land for which soil compaction constraints were obtained in step 102. In one implementation, the path received in step 210 may comprise a path that was determined independent of soil compaction characteristics of the field or plot of land, independent of soil compaction constraints, independent of varying soil compaction characteristics of mobile machine MM 2 and/or independent of varying environmental conditions. In another implementation, where method methods 400 and 500 are used in conjunction with one another, the path received in step 510 may be the recommended path as determined in step 406. The path obtained in step 510 may be manually input by the operator or may be retrieved from a database in memory 28 or another memory.

As indicated by step 512, processor 30 controlling MM 2 and following instructions contained in memory 28, controls the variable soil compaction characteristics of mobile machine MM 2 based upon the path received in step 510 and the obtained soil compaction constraints of the different regions of the field or plot of land being worked. Control of the variable soil compaction characteristics of mobile machine MM 2 means the establishment and/or adjusting of parameters associated with the operation of mobile machine MM 2 which impact soil compaction. Examples of such control over the variable soil compaction characteristics of mobile machine MM 2 include, but are not limited to, controlling or adjusting the tire pressure of mobile machine 22, controlling or adjusting energy consumption by mobile machine MM 2, controlling or adjusting the extent that herbicide, insecticide, water and fertilizer is supplied to MM 1 at one or more locations along the path of MM 1, and controlling or adjusting the extent that commodity (the harvested crop) is received from mobile machine MM 1 at one or more locations and one or more times along the path of MM 1.

For example, processor 30 may generate control signals adjusting energy consumption by generate control signals that vary or control at what times mobile machine MM 2 runs of electrical power versus at what times mobile machine MM 2 runs on fuel. Processor 30 may generate control signals controlling or adjusting the speed at which mobile machine MM 2 traverses a region and the rate at which fuel is consumed to impact soil compaction characteristics of mobile machine MM 2. In some implementations, processor 30 may generate control signals controlling or adjusting how the mobile machine MM 2 interacts with the soil such as the width of the tires or the number of tires lowered into engagement with the ground.

In one implementation, such control of the one or more varying soil compaction characteristics of mobile machine 22 may be automatically performed by processor 30 automatically generating control signals during the operation of mobile machine 22. In another implementation, processor 30 may prompt an operator to confirm any adjustment of such varying soil compaction characteristics of mobile machine MM 2 year prior to operation of mobile machine MM 2 or during the operation of mobile machine MM 2 within a field. In one implementation, processor 30 may prompt the operator to select which varying soil compaction constraints of mobile machine MM 2 may be automatically adjusted in which adjustments require operator confirmation or approval.

In some implementations, processor 30 may base its control of the variable soil compaction characteristics of mobile machine MM 2 on other factors in addition to the particular soil compaction constraints of the particular regions and the route of the path of mobile machine MM 2. For example, processor 30 may additionally obtain information regarding the operational cost of mobile machine MM 2, the cost associated with the time being utilized to operate mobile machine MM 2, the expected yield gains (or losses) associated with such control adjustments, commodity market prices, time deadlines due to upcoming weather events and the like. Upon obtaining such information, processor 30 may adjust the control of the variable soil compaction characteristics of the mobile machine MM 2 based upon selection criteria. For example, in one implementation, processor 30, following instructions contained in memory 28, may prompt the operator to select or prioritize criteria. An operator may be presented with the option of choosing a control mode wherein one or more of such additional factors (operational cost, time costs, time deadlines etc.) are or are not factored into the control of the variable soil compaction characteristics of mobile machine MM 2. The operator may further input how such factors are weighted in such control. For example, processor 30 may compare the operational cost for one VSCC control option against the reduced soil compaction and corresponding estimated increase in yield to determine the economics of whether or not to implement such control or to what extent such control should be carried out.

FIG. 7 illustrates an example implementation of system 20 and methods 100, 200, 400 and 500 with respect to a field 600. As shown by FIG. 7, field 600 is partitioned into multiple regions 602A-602D (collectively referred to as regions 602). In the example illustrated, each of regions 602 has boundaries or is partitioned such that substantially homogenous soil compaction characteristics exist within each of regions 602. Each of regions 602 is assigned one or more soil compaction constraints based upon the particular soil compaction characteristics of the region 302. In the example illustrated, region 602C is illustrated as having wet spot 604. As a result, region 602C may be more susceptible to soil compaction and may be assigned more stringent soil compaction constraints.

FIG. 7 illustrates path 608 through field 600 as determined by processor 30 according to method 100. As discussed above, upon obtaining soil compaction constraints assigned to each of regions 602, processor 30 further obtains varying soil compaction characteristics of the particular mobile machine MM 1 to act upon field 600. Based upon the obtained soil compaction constraints and the varying soil compaction characteristics of mobile machine MM 1, processor 30 determines path 608. In the example illustrated, with particular respect to the region 602C, path 608 may be drawn by processor 30 such that mobile machine MM 1 has a lower weight or otherwise has a lower soil compaction impact at those times that mobile machine MM 1 crosses region 602C so as to better satisfy the more stringent soil compaction constraints associated with region 602C. As noted above, in some implementations, path 608 may be devised by processor 30 based upon additional factors such as time, cost and path complexity. For example, path 608 may be devised to reduce the number of turns required of mobile machine MM 1 or to minimize fuel consumption while still satisfying the soil compaction constraints or minimally deviating from such soil compaction constraints.

During movement of mobile machine MM 1 along path 608, processor 30 may determine or retrieve information regarding the varying soil compaction characteristics of mobile machine 22. Based upon path 608 and the previously obtained soil compaction constraints of the various regions 602, processor 30 may adjust one or more varying soil compaction characteristics of mobile machine MM 1 to better accommodate soil compaction constraints assigned to the different regions 602. In other implementations, mobile machine MM 1 may estimate the varying soil compaction characteristics of mobile machine MM 1 at various locations along path 608 and may adjust one or more operations of mobile machine 22 to modify or adjust the soil compaction characteristics of mobile machine MM 1 at particular locations to better accommodate soil compaction constraints of regions 602. Such adjustments to the varying soil compaction characteristics of mobile machine MM 1 which are predetermined prior to the operation of mobile machine MM 1 in field 600 may be predetermined and stored in memory 28 for subsequent use while mobile machine 22 is operating in field 300.

By way of example with regard to region 602C, processor 30 may generate control signals adjusting energy consumption by mobile machine MM 1 such that the amount and weight of fuel within mobile machine MM 1 is at a low point when mobile machine MM 1 is crossing region 602C, thereby reducing the soil compaction of mobile machine MM 1 at such times. Such adjustment may be made by adjusting the rate at which fuel is consumed by mobile machine MM 1 or by appropriately switching mobile machine MM 1 to or from an alternate source of energy (such as a battery). Processor 30 may generate control signals causing display 26 to notify an operator at what times along path 608 that mobile MM 1 should be replenished with fuel, seed, insecticide, herbicide or fertilizer to minimize the weight added to mobile machine MM 1 when mobile machine MM 1 is traversing region 602C. In other implementations, processor 30 may generate control signals causing display 26 to notify an operator at what times along path 608 that mobile machine MM 1 should be emptied or discharged of commodity to reduce the weight of mobile machine MM 1 when mobile machine MM 1 is traversing region 602C. In some implementations, processor 30 may generate control signals automatically (or upon confirmation or approval from the operator) adjust the operational depth of mobile machine MM 1 when traversing region 602C to reduce soil compaction.

As further shown by FIG. 7, processor 30 (or a different processor than that which was used to determine the path for MM 1 and adjust varying soil compaction characteristics of MM 1) may also determine the path and adjust varying soil compaction characteristics of MM 2.

As discussed above, upon obtaining soil compaction constraints assigned to each of regions 602, processor 30 further obtains varying soil compaction characteristics of the particular mobile machine MM 2 when servicing MM 1. Based upon the obtained soil compaction constraints and the varying soil compaction characteristics of mobile machine MM 2, processor 30 determines path 658. In the example illustrated, with particular respect to the region 602C, path 658 may be drawn by processor 30 such that mobile machine MM 2 either has a lower weight or otherwise has a lower soil compaction impact at those times that mobile machine MM 2 crosses region 602C or entirely avoids traveling across region 602C so as to better satisfy the more stringent soil compaction constraints associated with region 602C as well as the other region 602. As noted above, in some implementations, path 658 may be devised by processor 30 based upon additional factors such as time, cost and path complexity. For example, path 658 may be devised to reduce the number of turns required of mobile machine MM 2 or to minimize fuel consumption while still satisfying the soil compaction constraints or minimally deviating from such soil compaction constraints.

During movement of mobile machine MM 2 along path 608, processor 30 may determine or retrieve information regarding the varying soil compaction characteristics of mobile machine MM 2. Based upon path 658 and the previously obtained soil compaction constraints of the various regions 602, processor 30 may adjust one or more varying soil compaction characteristics of mobile machine MM 2 to better accommodate soil compaction constraints assigned to the different regions 602. In other implementations, processor 30 may estimate the varying soil compaction characteristics of mobile machine MM 2 at various locations along path 658 and may adjust one or more operations of mobile machine MM 2 to modify or adjust the soil compaction characteristics of mobile machine MM 2 at particular locations to better accommodate soil compaction constraints of regions 602. Such adjustments to the varying soil compaction characteristics of mobile machine MM 2 which are predetermined prior to the operation of mobile machine MM 2 in field 600 may be predetermined and stored in memory 28 for subsequent use while mobile machine 22 is operating in field 600.

By way of example with regard to region 602C, processor 30 may generate control signals adjusting energy consumption by mobile machine MM 2 such that the amount and weight of fuel within mobile machine MM 2 is at a low point when mobile machine MM 2 is crossing region 602C, thereby reducing the soil compaction of mobile machine MM 2 at such times. Such adjustment may be made by adjusting the rate at which fuel is consumed by mobile machine MM 2 or by appropriately switching mobile machine MM 2 to an alternate source of energy (such as a battery). Processor 30 may generate control signals causing display 26 to notify an operator at what points along path 658 that mobile MM 2 should replenished MM 1 fuel, seed, insecticide, herbicide or fertilizer to minimize the weight added to mobile machine MM 2 when mobile machine MM 1 is traversing region 602C. In other implementations, processor 30 may generate control signals causing display 26 to notify an operator at what points along path 658 that mobile machine MM 2 receive commodity from MM 1 to reduce the weight of mobile machine MM 1 when mobile machine MM 1 is traversing region 602C and to also best satisfy the soil compaction constraints of region 602 when MM 2 is leaving the field with the received commodity.

FIGS. 8 and 9 illustrate various ways of expressing soil compaction constraints for a region of a field. As discussed above, in an example implementation, a soil compaction constraint may be expressed as a maximum machine operating weight that may be placed upon the region. The machine operating weight is the weight of the mobile machine plus any consumable or dischargeable solids, liquids or substances carried by the machine such as fuel, seed, fertilizer (including both dry fertilizer and liquid fertilizer), insecticide, herbicide, water and the like.

As shown by FIG. 8, in another implementation, a soil compaction constraint may be expressed as a maximum wheel load which would constitute a limit upon soil compaction in PSI at a certain value at a certain depth (for example, tillage depth) as shown by FIG. 9. A soil compaction constraint may also be expressed as a maximum yield reduction due to soil compaction. In one implementation, such a soil compaction constraint may be further based upon market price for a unit of crop, wherein the soil compaction constraint is expressed as a limit to the estimated value of crop lost to yield reduction at a given market price for a unit of the crop.

FIG. 10 schematically illustrates soil compaction reduction system 920, a particular implementation of soil compaction reduction system 20. System 920 comprises mobile machine 922 and control source 923. Mobile machine 922 supports and carries steering control 24, display 26, processor 30, and memory 28, each of which is described above with respect to system 20 in FIG. 1. Mobile machine 922 additionally comprises tires 924 and corresponding tire pressure sensors 926 and inflation systems 927, fuel reservoir 928 and fuel sensor 930, battery 932, drive 934, stores 938, applicator/discharger 940, store sensor 942 and transmitter/receiver 944.

Tires 924 support and elevate mobile machine 922 above the terrain or ground. Sensors 926 sense the pressure within their corresponding tires 924 and transmit signals to processor 30 indicating such tire pressures. Inflation systems 927 are part of a central tire inflation system and operate under the control of processor 30 to inflate their associated tires 924 to a selected pressure. In operation, based upon certain criteria, such as, the sensed pressure of tires 924 as indicated by sensors 926, the particular location or region being traversed along a path through a field and the soil compaction constraints of the region of the field, processor 30 generates control signals adjusting or controlling the pressure of one or more of tires 924 to adjust the soil compaction characteristics of mobile machine 922.

Fuel reservoir 928 comprises one or more tanks or other storage volumes storing fuel for powering drive 934 of mobile machine 922. Sensor 930 senses the volume and/or weight of the fuel within fuel reservoir 928 and transmits signals indicating such information to processor 30. Battery 932 comprises one or more batteries storing electrical charge for use by mobile machine 922 including drive 934. Drive 934 comprises a mechanism to propel mobile machine 922. In the example illustrated, drive 934 comprises a hybrid drive having an internal combustion engine to run on fuel supplied from fuel reservoir 928 and an electrical motor powered drive configured to run off electrical charge supplied by battery 932. In operation, based upon the sensed volume and/or weight of the fuel (diesel fuel, gasoline, natural gas etc.) within fuel reservoir 928 as indicated by the one or more sensors 930, the particular location or region being traversed along a path through a field and the soil compaction constraints of the region of the field, processor 30 generate control signals adjusting or controlling the use of energy by drive 934. For example, processor 30 may generate control signals conserving fuel in reservoir 928 by utilizing energy stored in battery 932 to avoid having to fill fuel reservoir 928 just prior to mobile machine 922 traveling across a region, for example a region having stringent soil compaction constraints. In another example, energy from fuel reservoir 928 may be preferred to energy from battery 932 in order to reduce the weight of fuel in fuel reservoir 928.

Stores 938 comprise one or more holding volumes or holding bins carried by mobile machine 922 for storing either commodity 950 (such as when mobile machine 922 is a harvester) or one or more field applicants such as seed 952, fertilizer 954, herbicide 956, insecticide 958 or water 960. Applicator-discharger 940 comprises a device by which such materials within stores 938 are applied to the field or discharged. In situations where mobile machine 92 is a harvester, applicator-discharger comprises a chute through which commodity may be discharged to a wagon, truck or other transport. In another implementation, mobile machine 92 is a baler, wherein applicator-discharger 940 comprises a mechanism through which a bale is discharged. In other implementations, applicator-discharger 940 may comprise a sprayer, a grain drill, injecting knife or other mechanism to distribute and/or locate applicants on top of or within the soil. Sensor 942 comprises one or more sensors to sense the volume and/or weight of each of the applicants contained in stores 938. Sensor 942 transmits signals indicating such volumes or weight to processor 30.

In operation, based upon the sensed volume and/or weight of the commodity or applicants in stores 938 as indicated by the one or more sensors 942, the particular location or region being traversed along a path through a field and the soil compaction constraints of the region of the field, processor 30 generates control signals adjusting or controlling the consumption or discharging of such applicants and/or commodities. For example, processor 30 may generate control signals adjusting the rate at which such applicants are applied to the soil to either conserve such applicants to avoid having a refill of such applicants just prior to mobile machine 922 traveling across a region having stringent soil compaction constraints or to distribute a greater amount of such resources prior to reaching the region having a more stringent soil compaction constraint to reduce the weight of mobile machine 922 and its soil compaction characteristics. In other implementations, such varying soil compaction characteristics are merely sensed and stored for use in determining a path of mobile machine 922.

Transmitter receiver 944 comprises a communication device for communicating with control source 923. Control source 923 comprises a location remote from mobile machine 922 or a portable device from which data and/or controls may be transmitted to mobile machine 922. Control source 923 comprises display 966, input 968, memory 970, transmitter/receiver 972 and processor 974.

Display 966 comprises a device by which information may be visibly presented to an operator of mobile machine 922 or a monitor/manager of mobile machine 922. Display 966 comprises a monitor or screen which is stationary in nature or which is mobile in nature. In another implementation, display 966 comprises a stationary monitor remote from mobile machine 922 or one that is mobile in nature, being provided as part of a computer tablet, smart phone, personal data assistant (PDA) and the like. In one implementation, display 966 may provide a visual display of the terrain in front of mobile machine 922, wherein mobile machine 922 includes a camera. Such information may be used for remote steering and control of mobile machine 922 or for monitoring the operation of mobile machine 922.

Input 968 comprises one or more devices by which controls and input are provided to remote system 923. Examples of input 968 include, but are not limited to, a keyboard, a touchpad, a touch screen, a steering wheel or steering control, a joystick, a microphone with associated speech recognition software and the like. Input 968 facilitates the input of selections, commands or controls. In implementations where mobile machine 92 is remotely controlled, mobile machine 922 is remotely steered, input 968 may facilitate such remote steering.

Memory 970 comprises a non-transient computer-readable medium or persistent storage device for storing data for use by processor 30 or generated by processor 30. In one implementation, memory 970 additionally stores instructions in the form of code or software for processor 974 or processor 30. The instructions may be loaded in a random access memory (RAM) for execution by processor 30 from a read only memory (ROM), a mass storage device, or some other persistent storage. In other implementations, hard wired circuitry may be used in place of or in combination with software instructions to implement the functions described. For example, at least regions of memory 970 and processor 974 may be embodied as part of one or more application-specific integrated circuits (ASICs).

Processor 974 comprises one or more processing units configured to carry out instructions either hardwired as part of an application-specific integrated circuit or provided as code or software stored in memory 970. Processor 974, following instructions contained in memory 970, may generate control signals which are transmitted by transmitter receiver 972 to transmitter/receiver 944 and to processor 30 for the control of mobile machine 922. As noted above, in some implementations, such control provided by processor 974 may be for the steering of mobile machine 922. In other implementations, such control provided by processor 974 may be for the adjustment of soil compaction characteristics of mobile machine 922 pursuant to method 200 or method 500. In some implementations, the determination of a path for mobile machine 922 according to method 100 or method 400 may occur at control source 923 and may be transmitted to mobile machine 922 in a wireless fashion using transmitter/receivers 972, 944. In those implementations where the determination of the path for mobile machine 922 or the control over soil compaction characteristics of mobile machine 922 occur at control source 923, less functionality may be provided to display 26, memory 28 and processor 30 of mobile machine 922. In some implementations, one or more of such components may be omitted. In other implementations, control source 923 may be omitted.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A method comprising:
    determining a path for a mobile machine through a field based upon a varying soil compaction characteristic of the mobile machine as the mobile machine traverses the field based upon a soil compaction constraint;
    controlling the varying compaction characteristic of the mobile machine as the mobile machine traverses the field along the determined path based upon the soil compaction constraint, wherein controlling the varying compaction characteristic of the mobile machine comprises determining an extent to which the mobile machine is filled with replenishing supplies when replenished based upon the soil compaction constraint or an extent to which the mobile machine is filled with crops when being emptied based upon the soil compaction constraint.

2. The method of claim 1 further comprising assigning soil compaction constraints to different regions of the field, wherein the path is determined so as to satisfy the soil compaction constraints of the different regions.

3. The method of claim 1 further comprising assigning soil compaction constraints to different regions of the field, wherein the path is determined so as to minimize a collective deviation from the soil compaction constraints assigned to the different regions.

4. The method of claim 1 further comprising assigning soil compaction constraints to different regions of the field, wherein the path is determined so as to not deviate from any particular soil compaction constraint assigned to any particular region by a predetermined deviation amount.

5. The method of claim 1 further comprising:
    partitioning the field into regions based upon soil compaction characteristics; and
    assigning soil compaction constraints to different regions of the field.

6. The method of claim 5, wherein the compaction constraints assigned to the different regions each comprise at least one constraint selected from a group of constraints consisting of: a maximum operating weight of the mobile machine; a maximum estimated crop loss caused by compaction; and a maximum soil compaction at a predetermined depth.

7. The method of claim 1, wherein the varying compaction characteristic of the mobile machine comprises a varying operating weight of the mobile machine.

8. The method of claim 1, wherein the varying compaction characteristic of the mobile machine is based upon a varying quantity of at least one of fuel, seed, commodity, herbicide, insecticide and fertilizer momentarily carried by the mobile machine.

9. The method of claim 1, wherein the path is determined based at least in part upon a second path of a second mobile machine across the field and resulting soil compaction of one or more of the regions along the second path by the second mobile machine.

10. A soil compaction reduction system comprising:
    a non-transient computer-readable medium containing computer readable code to direct one or more processing units to:
    determine a path for a mobile machine through a field based upon a varying soil compaction characteristic of the mobile machine as the mobile machine traverses the field based upon a soil compaction constraint; and direct one or more processing units to vary compaction characteristic of the mobile machine as a mobile machine traverses the field along the determined path based upon the compaction constraint, wherein the path for the mobile machine is determined based upon received data regarding a commodity price for crops of the field, estimated crop yield reductions resulting from soil compaction for each of different available paths, and a non-yield cost for the different available paths, the non-yield cost for the different available paths comprising at least one cost selected from a group of costs consisting of: operational costs for the mobile machine free to the different available paths and time costs for each of the different available paths.

11. The system of claim 10, wherein the computer readable code is configured direct one or more processing units to assign soil compaction constraints to different regions of the field, wherein the path is determined based at least in part upon the soil compaction constraints assigned to the different regions of the field.

12. The system of claim 10, wherein the path is determined based at least in part upon a second path of a second mobile machine across the field and resulting soil compaction along the second path by the second mobile machine.

13. A method comprising:
partitioning the field into the regions based upon soil compaction characteristics;
determining a path for a mobile machine through the field based upon a varying soil compaction characteristic of the mobile machine as the mobile machine traverses the field based upon the soil compaction constraints; and
selecting between a first group of at least one servicing mobile machine and a second group of at least one servicing mobile machine, different than the first group, for servicing the mobile machine along the determined path, the selection being based upon the soil compaction constraint.

14. The method of claim 1, wherein the path for the mobile machine is determined based upon received data regarding a commodity price for crops of the field, estimated crop yield reductions resulting from soil compaction for each of different available paths, and a non-yield cost for the different available paths, the non-yield cost for the different available paths comprising at least one cost selected from a group of costs consisting of: operational costs for the mobile machine for each of the different available paths and time costs for each of the different available paths.

15. The method of claim 1, wherein the determined extent is less than a complete filling of the mobile machine with the replenishing supplies.

16. The method of claim 1 further comprising selecting between a first servicing mobile machine having a first size and a first weight when the first servicing mobile machine is carrying the replenishing supplies and a second servicing mobile machine having a second size smaller than the first size and a second weight less than the first weight when the second servicing mobile machine is carrying the replenishing supplies for servicing of the mobile machine along the determined path, the selection being based upon the soil compaction constraint.

17. The method of claim 1 further comprising selecting between a first group of at least one servicing mobile machine and a second group of at least one servicing mobile machine, different than the first group, for servicing the mobile machine, the selection being based upon the soil compaction constraint.

18. The system of claim 10, wherein the computer readable code is configured to direct the one or more processing units to determine at what points along the path that the mobile machine is to be emptied of crops despite not being full or at what points along the path that the mobile machine is to be replenished with supplies despite not having exhausted the supplies based upon the soil compaction constraints.

19. The system of claim 10 wherein the computer readable code is configured to direct the one or more processing units to select between a first servicing mobile machine having a first size and a first weight when the first servicing mobile machine is carrying the replenishing supplies and a second servicing mobile machine having a second size smaller than the first size and a second weight less than the first weight when the second servicing mobile machine is carrying the replenishing supplies for servicing of the mobile machine along the determined path, the selection being based upon the soil compaction constraint.

20. The system of claim 10, wherein the computer readable code is configured to direct the one or more processing units to select between a first group of at least one servicing mobile machine and a second group of at least one servicing mobile machine, different than the first group, for servicing the mobile machine, the selection being based upon the soil compaction constraint.

21. The system of claim 10, wherein the computer readable code is configured to direct the one or more processing units to determine at what points along the path that the mobile machine is to be emptied of crops or at what points along the path that the mobile machine is to be replenished with supplies based upon the soil compaction constraints independent of a load of the mobile machine relative to a load capacity of the mobile machine.

* * * * *